United States Patent [19]
Herbert

[11] 3,976,175
[45] Aug. 24, 1976

[54] SELF-ENERGIZING CLUTCH

[76] Inventor: William B. Herbert, 111 Yantacaw Brook Road, Upper Montclair, N.J. 07043

[22] Filed: Mar. 3, 1975

[21] Appl. No.: 554,907

[52] U.S. Cl. .................................. 192/44; 192/47
[51] Int. Cl.² ...................................... F16D 41/08
[58] Field of Search ............................. 192/44, 47

[56] References Cited
UNITED STATES PATENTS

| | | | |
|---|---|---|---|
| 1,782,605 | 11/1930 | Farley | 192/47 |
| 1,927,046 | 9/1933 | Powell | 192/47 X |
| 1,957,500 | 5/1934 | Harris et al. | 192/44 X |
| 2,077,253 | 4/1937 | Nardone | 192/47 X |
| 3,302,760 | 2/1967 | Taylor | 192/47 X |

FOREIGN PATENTS OR APPLICATIONS

| | | | |
|---|---|---|---|
| 123,023 | 5/1931 | Austria | 192/44 |

*Primary Examiner*—Allan D. Herrmann
*Attorney, Agent, or Firm*—Isler and Ornstein

[57] ABSTRACT

A self-energizing clutch is disclosed, which is of such construction as to enable it to be engaged or disengaged at will, irrespective of the direction or relative speed of rotation, as between the driving and driven components of the clutch. The clutch consists of components or parts which are quickly and easily assemblable, and which are resistant to breakage or damage during the operation of the clutch. A particular feature of the clutch is the creation of a tangential force during operation of the clutch, which exceeds the torque or force between the driving and driven parts of the clutch, in order to disengage the clutch.

8 Claims, 13 Drawing Figures

SELF-ENERGIZING CLUTCH

This invention relates, as indicated, to clutches, but has reference more particularly to that type of clutch in which motion is transmitted from the driving to the driven part by frictional contact.

In previous types of clutches of the overrunning type, as exemplified by Odorica et al U.S. Pat. No. 3,295,625 and Massey U.S. Pat. No. 3,476,226, flats or ramps and rollers are employed, but such clutches do not provide the capability of permitting the clutch to become engaged or disengaged at will, and without regard to the direction of rotation or relative speeds between the driving and driven parts of the clutch.

A primary object of the invention is to provide a clutch having the capability of becoming engaged or disengaged at will, irrespective of the direction or relative speed of rotation, as between the driving and driven components of the clutch.

Another object of the invention is to provide a clutch of the character described, which has embodied therein components or parts which are quickly and easily assemblable, and are of such construction as to resist breakage or damage to the components in the operation of the clutch.

Other objects and advantages of my invention will be apparent during the course of the following description.

In the accompanying drawings forming a part of this specification, and in which like numerals are employed to designate like parts throughout the same, FIG. 1 is an elevational view of one end of a preferred form of clutch embodying the invention;

Figure 1:
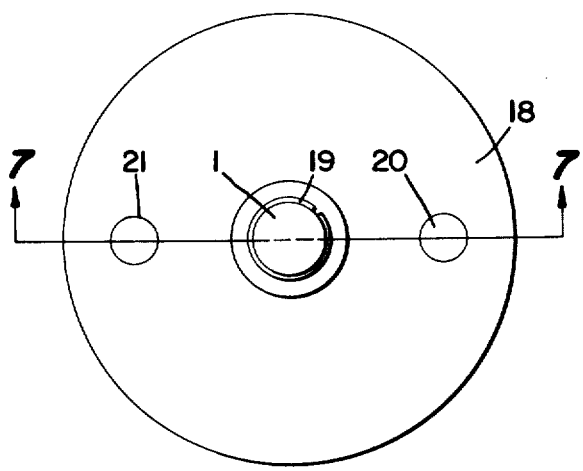
Figure 2:
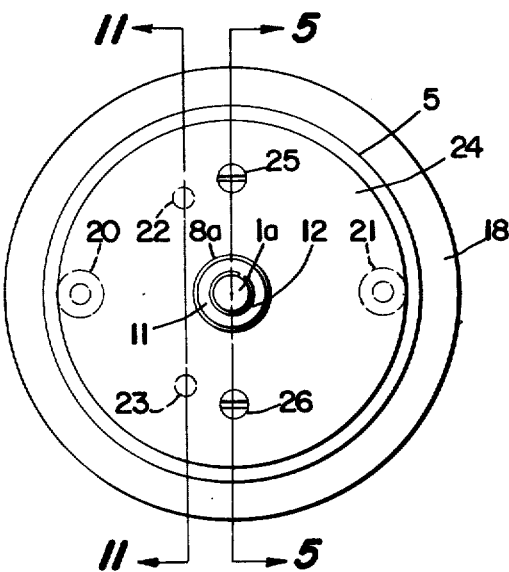
FIG. 2 is an elevational view of the other end of the clutch of FIG. 1.
Figure 3:
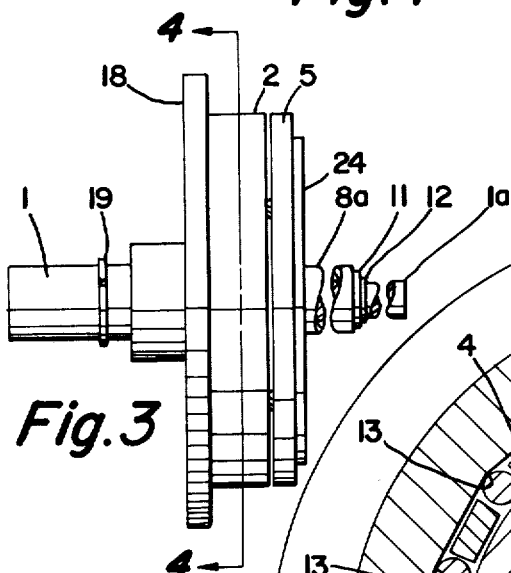
FIG. 3 is a side elevational view of the clutch.

Referring more particularly to the drawings, the clutch will be seen to comprise a drive or driving shaft 1 having an elongated axial extension 1a of reduced diameter.

The extension 1a of the drive shaft has keyed or otherwise secured thereto, at the base thereof, a driving cup 2 having a recess 3 in one end thereof, which recess is bounded at its periphery with a multiplicity of flats or flat surfaces 4, each of which is angularly disposed to the flats or flat surfaces adjacent thereto. The function of these flats or flat surfaces will be presently described.

Disposed adjacent the recessed end of the cup 2 is a cage 5 of substantially the same diameter as the cup 2, and provided at its inner face with a multiplicity of circumferentially-spaced projections or bars 6, formed integrally with the cage 5. The projections or bars 6 are equivalent in number to the flats or flat surfaces 4, and each projection 6 has its radially-outermost face disposed closely adjacent one of the faces 4 of the cup 2.

Disposed between each pair of projections 6 is a roller 7, the functions of which will be presently discussed.

There is also disposed within the recess 3, a rotor 8, which is free to rotate about the extension 1a of the shaft 1. The rotor 8 is provided with a hub-like extension 8a, constituting an output or driven shaft, formed integrally with the rotor 8. The shaft 8a is mounted to rotate about spaced bearings 9 and 10, which are interposed between the shaft 8a and the extension 1a of the shaft 1.

The outer end of the shaft 8a bears against a thrust bearing 11, which is mounted on the extension 1a of the shaft 1, and is retained in position by means of a retaining ring 12 which is secured to the extension 1a.

Figure 4:
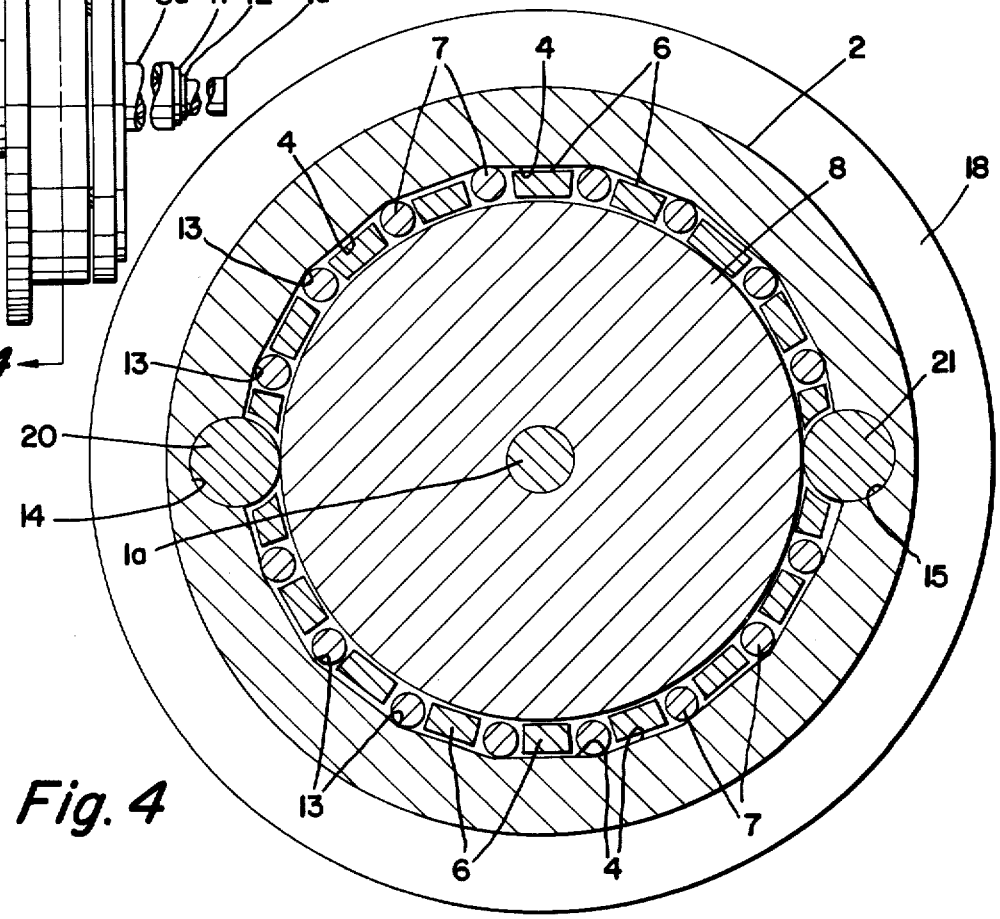
FIG. 4 is a cross-sectional view, on an enlarged scale, taken on the line 4—4 of FIG. 3.

The relative alignment between the cup 2 and cage 5 causes the rollers 7 to remain in the corners 13 (FIG. 4) formed at the intersection between the flats 4, but in an otherwise free state, due to the fact that the diameter of the rollers 7 is smaller than the distance between the outer periphery of the rotor 8 and the corners 13. With the rollers 7 thus disposed, the rotor 8 is free to rotate. During rotation of the rotor 8 in the disengaged state, the rollers 7 will not rub on the rotor 8, since the centrifugal force exerted on the rollers will serve to prevent contact of the rollers with the rotor.

Figure 6:
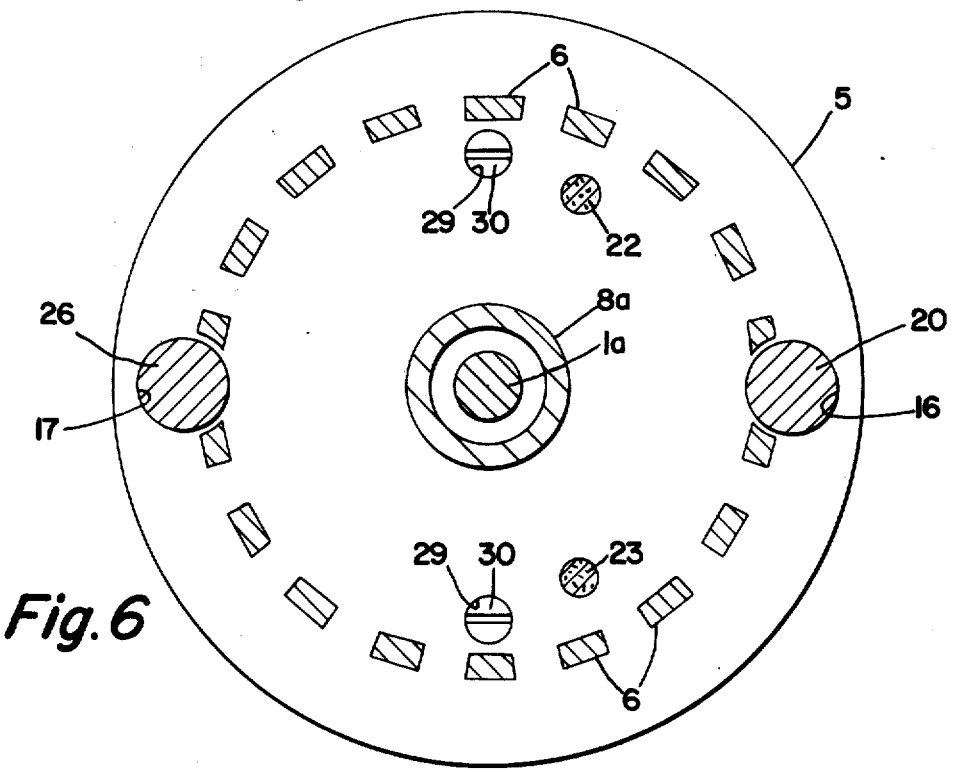
FIG. 6 is a cross-sectional view, taken on the line 6—6 of FIG. 5.

The cup 2 is provided at diametrically-opposite sides thereof with a pair of openings or holes 14 and 15 (FIG. 4), and the cage 5 is similarly provided at diametrically-opposite sides thereof with a pair of openings or holes 16 and 17 (FIG. 6) of the same diameter as the openings 14 and 15, and which are adapted to be axially aligned respectively with the openings 16 and 17, as will be presently explained.

Mounted for slidable movement axially of the drive shaft 1 is a control member 18, which is shiftable or slidable between the cup 2 and a retainer ring 19 mounted on the shaft 1. The member 18 is provided, at points thereof spaced to correspond to the distance between the openings 14 and 15, with a pair of control pins 20 and 21.

The pins 20 and 21 have portions 20a and 21a thereof of the same diameter as the openings 14 and 15, and have terminal portions 20b and 21b of a diameter less than the diameter of the portions 20a and 21a, the portion 20b being joined to the portion 20a by a conical portion 20c, and the portion 21b being joined to the portion 21a by a conical portion 21c.

The cage 5 is also provided with spaced pressure pads 22 and 23 (FIGS. 2, 6, 11, 12 and 13) which extend through the cage and serve a purpose to be presently described.

Figure 5:
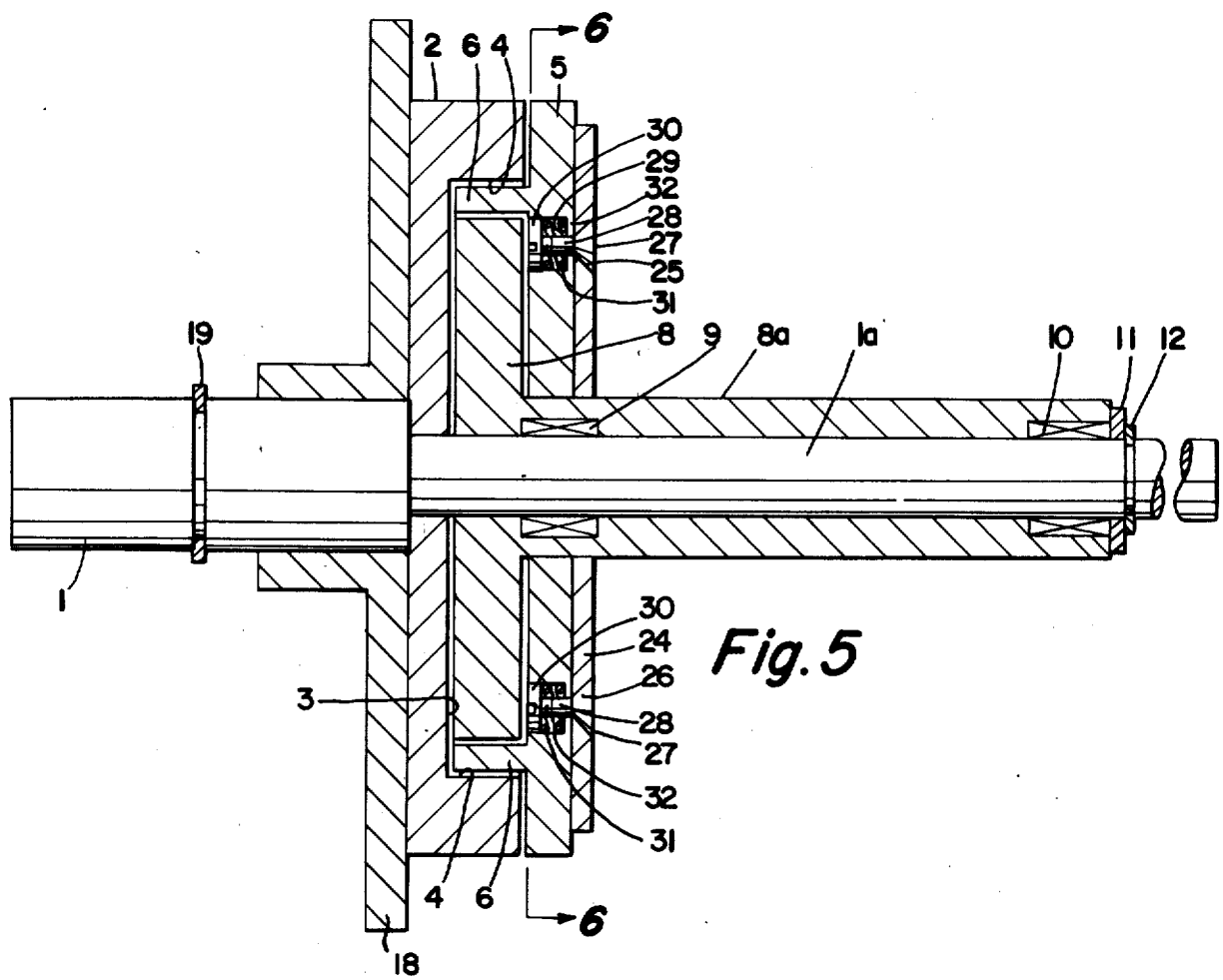
FIG. 5 is a cross-sectional view, on an enlarged scale, taken on the line 5—5 of FIG. 2.

The clutch further includes a pressure pad control disc 24 (FIGS. 2, 3, 5, 6, 7, 8, 11, 12 and 13) having openings 25 and 26 (FIG. 5) therein at diametrically-opposite sides of the disc, which openings are designed to receive screws 27, the stems 28 of which extend into openings 29 in the cage 5, and are provided at their ends with nuts 30. Compression coil springs 31 are disposed in the openings 29 and are interposed between the nuts 30 and shoulders 32 of the cage 5.

Figure 7:
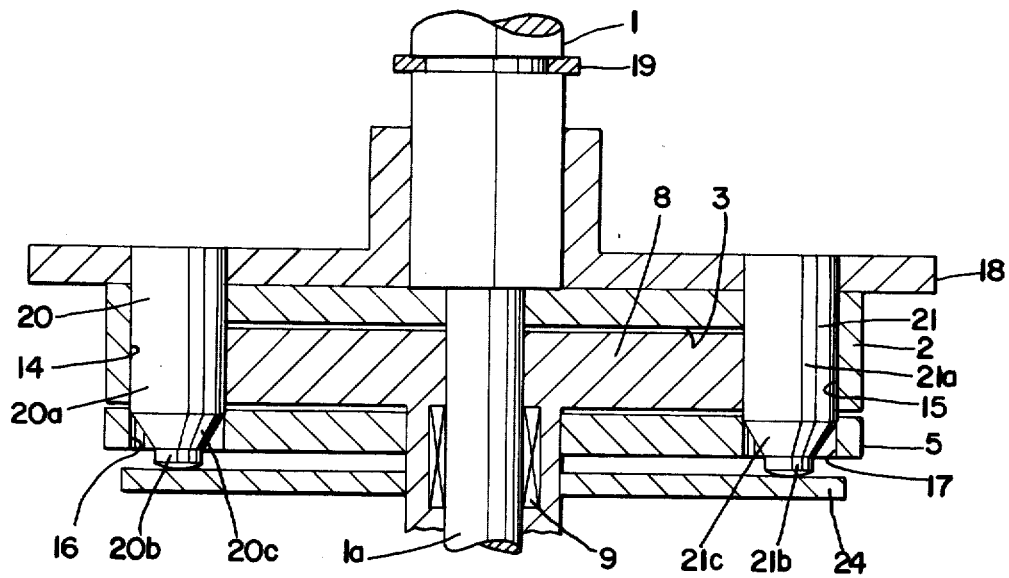
FIG. 7 is a cross-sectional view, on an enlarged scale, taken on the line 7—7 of FIG. 1, with the clutch control disengaged.

When the member 18 is shifted to the position shown in FIG. 7, the control pins 20 and 21 have the portions 20a and 21a thereof disposed in the openings 14 and 15 as well as in the openings 16 and 17, so that the cage 5 rotates with the cup 2.

The relative alignment between the cup 2 and cage 5 at such time is such as to cause the rollers 7, due to the centrifugal force exerted on the rollers, to remain in the corners 13, with the result that the rotor 8 does not rotate, and the clutch is disengaged.

Figure 8:
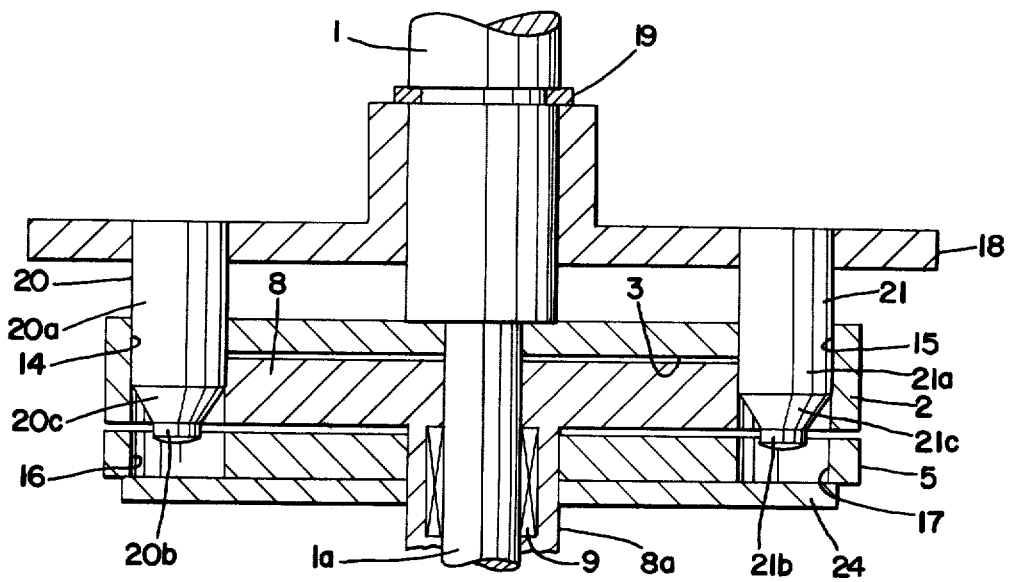
FIG. 8 is a view similar to FIG. 7, but with the clutch control engaged.
Figure 9:
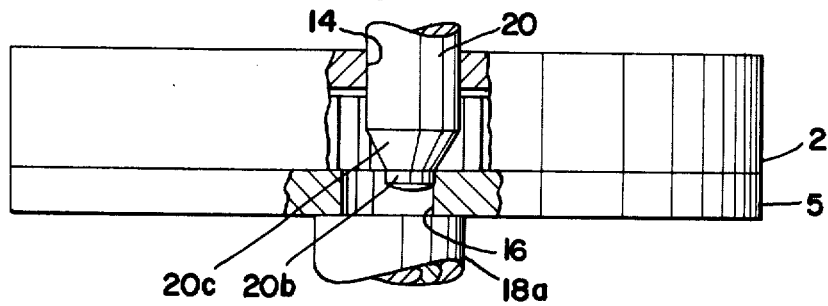
FIG. 9 is a view partly in elevation, and partly in section, showing circumferential displacement of the cup of the clutch relatively to the cage of the clutch.
Figure 10:
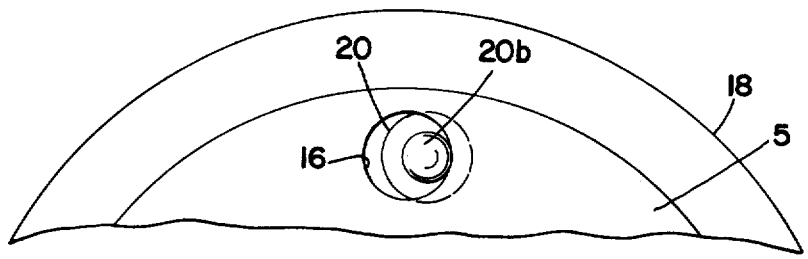
FIG. 10 is a fragmentary plan view of the parts in FIG. 9, as viewed from the bottom of FIG. 9.
Figure 11:
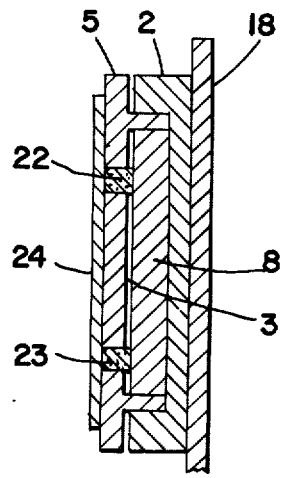
FIG. 11 is a cross-sectional view, taken on the line 11—11 of FIG. 2.

When the member 18 is shifted to the position shown in FIG. 8, the portions 20a and 21a of the control pins 20 and 21 are retracted from the openings 16 and 17 of the cage 5, so that the cage 5 can move to the extent permitted by the portions 20b and 21b of the control pins 20 and 21 circumferentially relatively to the cup 2. This circumferential displacement of the cage 5 from the cup 2 is illustrated in FIGS. 9 and 10. The springs 31 then cause the control disc 24 to apply pressure on those ends of the pressure pads 22 and 23 which engage the face of the rotor 8 which is not rotating. This pressure retards rotation of the cage 5 in relation to that of cup 2, causing the cage 5 to assume a trailing position in relation to cup 2.

This relative circumferential movement between cage 5 and cup 2 causes the rollers 7 to become wedged between the flats 4 of the cup 3 and the peripheral surface of the rotor 8, which, in turn, produces a positive driving action of the rotor 8 and the shaft 8a. This may be referred to as the self-energizing feature of the clutch, which eliminates the need for an external force, such as compressed air, springs, hydraulic means, or magnetic means, for creating pressure between two or more surfaces, thereby eliminating the waste of energy and the creation of heat usually associated with the operation of clutches.

It may be noted, at this point, that this driving action is effected in either direction of rotation of the drive shaft 1.

Figure 12:
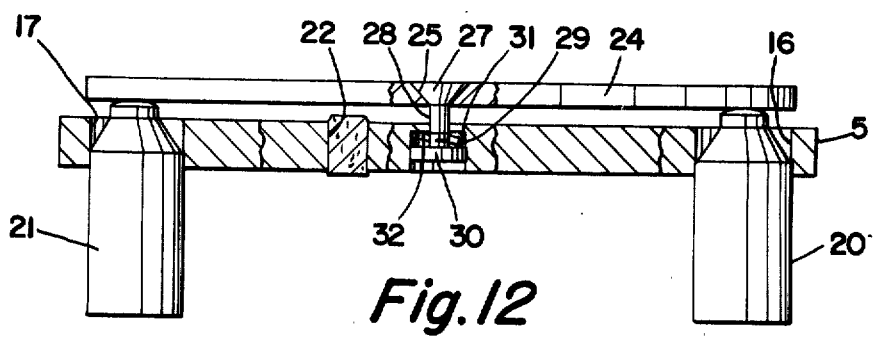
FIG. 12 is a view, partly in elevation and partly in section, of certain of the parts in the disengaged position of the clutch control.
Figure 13:
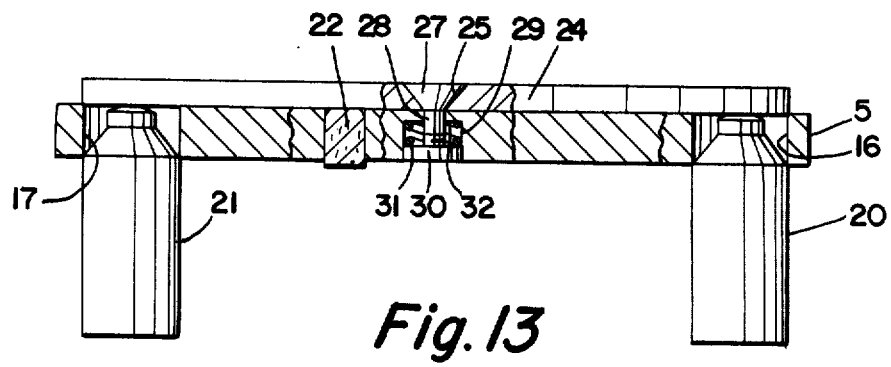
FIG. 13 is a view similar to FIG. 12, with the parts in the engaged position of the clutch control.

When the member 18 is moved to the neutral or disengaged position, shown in FIG. 7, the control disc 24 is lifted off the pressure pads 22 and 23 by the ends of the control pins 19 and 20 (see FIG. 12).

The retaining ring 19 prevents the member 18 from permitting the control pins 20 and 21 from being withdrawn too far from cup 2 or cage 5. Return of the member 18 to its neutral position causes the cup 2 and cage 5 to again become circumferentially realigned, and permits the rollers 7 to return to their free state in the corners 13. Due to the wedging or tapered relation or action of the pins 20 and 21, in relation to the holes or openings 16 and 17, as explained above, and as illustrated in FIGS. 9 and 10, a tangential force is created which exceeds the torque or force between the driving and driven parts of the clutch. The force required to allow this clutch to become disengaged is minimal, while the force required to cause the clutch to become disengaged is momentary only.

The axial movement of the control member 18 and its pins 20 and 21 into either engaged (driving) position or disengaged (neutral) position may be activated by any of a variety of forces, including compressed air, hydraulic, magnetic, or manual force, operating only momentarily, and requiring virtually no energy or force to keep the clutch engaged or disengaged.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

I claim:

1. In a clutch of the character described, a driving cup having a recess in one end thereof bounded at its periphery by a multiplicity of flat surfaces, each of which is disposed angularly to the surfaces immediately adjacent thereto, a cage disposed adjacent said cup and having a face adjacent said recess provided with a multiplicity of circumferentially-spaced projections or bars extending into said recess and each having its radially-outermost face disposed closely adjacent one of said flat surfaces, a rotor disposed within said recess and having an annular outer surface disposed radially-inwardly of said projections or bars, and rollers disposed between the periphery of said recess and said annular outer surface, said rollers being interposed between said projections or bars.

2. A clutch, as defined in claim 1, including a driving shaft for driving said cup, and a driven shaft extending axially from said rotor.

3. A clutch, as defined in claim 2, wherein said cup is provided with diametrically-spaced holes of predetermined diameter, said cage is provided with holes spaced to correspond with the spacing of said first-named holes and of the same diameter as said first-named holes, and means is provided for maintaining said cup and cage in a position in which the holes of said cup are aligned axially with the holes of said cage, said means comprising a control member slidable along said driving shaft and provided with pins spaced to correspond with the spacing of said holes and slidable through said holes, said pins having portions of a diameter equivalent to the diameter of said holes, and terminal portions of a diameter less than the diameter of said holes, whereby in the disengaged condition of the clutch, said pins have the first-named portions thereof disposed in the holes of the cup and cage, and in the engaged condition of the clutch, said pins have the first-named portions thereof disposed in only the holes of the cup, and the terminal portions thereof disposed in the holes of the cage.

4. In a clutch of the character described, a driving cup having a recess in one end thereof bounded at its periphery by a multiplicity of flat surfaces, each of which is disposed angularly to the surfaces immediately adjacent thereto, a driving shaft for driving said cup, a cage disposed adjacent said cup and having a face adjacent said recess provided with a multiplicity of circumferentially-spaced projections or bars extending into said recess and each having its radially-outermost face disposed closely adjacent one of said flat surfaces, a rotor disposed within said recess and having an annular outer surface disposed radially-inwardly of said projections or bars, a driven shaft extending axially from said rotor, rollers disposed between the periphery of said recess and said annular outer surface, said rollers being interposed between said projections or bars, said cup being provided with diametrically-spaced holes of predetermined diameter, said cage being provided with holes spaced to correspond with the spacing of said first-named holes, means for maintaining said cup and cage in a position in which the holes of said cup are aligned axially with the holes of said cage, said means comprising a control member slidable along said driving shaft and provided with pins spaced to correspond with the spacing of said holes and slidable through said holes, said pins having portions of a diameter equivalent to the diameter of said holes, and terminal portions of a diameter less than the diameter of said holes, whereby in the disengaged position of the clutch, said pins have the first-named portions thereof disposed in the holes of the cup and cage, and in the engaged condition of the clutch, said pins have the first-named portions thereof disposed in only the holes of the cup, and the terminal portions thereof disposed in the holes of the cage said cage being provided with pressure pads, a pressure pad control disc, and means for resiliently biasing said control disc into engagement with said pressure pads, whereby to cause said control disc to resist rotation of said cage.

5. A clutch, as defined in claim 4, wherein said control disc is responsive to axial movement of said pins to cause disengagement of the control disc from said pressure pads, and place the clutch in disengaged position.

6. In a clutch of the character described, a member of generally annular form having an interior wall consisting of a multiplicity of flat surfaces, each of which is disposed angularly to the surface immediately adjacent thereto, a cage having an end face disposed adjacent said member and provided with a multiplicity of circumferentially-spaced bars projecting therefrom and having a radially-outermost face disposed closely adjacent one of said flat surfaces, a rotor extending into said member and having an annular outer surface disposed radially-inwardly of said bars, and rollers disposed between said interior wall of said member and said annular outer surface of said rotor, said rollers being interposed between said bars.

7. In a clutch of the character described, a drive shaft, a driving cup driven by said shaft, a cage disposed adjacent said driving cup and having circumferentially-spaced bars projecting therefrom and into said driving cup, rollers disposed in the spaces between said bars, a rotor adapted to be rotated by wedging engagement of said rollers with said rotor, a control member shiftable between selected positions spaced axially of said drive shaft, said control member provided with control pins coacting with said driving cup and cage, whereby when said control member is in one of said selected positions, said rotor does not rotate, but when in the other of said selected positions, the rotor is rotated.

8. A clutch, as defined in claim 7, wherein said cage is provided with pressure pads adapted to engage the face of said rotor, and said clutch further includes a control disc having spring means for causing the disc to apply pressure to the ends of the pressure pads when the rotor is not rotating, said pressure retarding rotation of said cage in relation to that of said cup, whereby the cage assumes a trailing position in relation to the cup, and the relative circumferential movement between the cup and the peripheral surface of the rotor, to thereby produce a positive driving action of the rotor.

* * * * *